United States Patent
Velsen et al.

(10) Patent No.: US 6,520,416 B1
(45) Date of Patent: Feb. 18, 2003

(54) INTERFACE MODULE FOR OPERATION BETWEEN A CHIP CARD AND A MICROPROCESSOR-BASED SYSTEM

(75) Inventors: Jürgen Velsen, Lichtenau (DE); Rainer Neumann, Bad Lippspringe (DE)

(73) Assignee: SC Itec GmbH, Paderborn (DE)

( * ) Notice: Subject to any disclaimer, the term of this patent is extended or adjusted under 35 U.S.C. 154(b) by 0 days.

(21) Appl. No.: 09/308,630

(22) PCT Filed: Sep. 22, 1998

(86) PCT No.: PCT/DE98/02805
§ 371 (c)(1),
(2), (4) Date: Jul. 30, 1999

(87) PCT Pub. No.: WO99/17247
PCT Pub. Date: Apr. 8, 1999

(30) Foreign Application Priority Data

Sep. 26, 1997 (DE) .......................................... 197 42 459

(51) Int. Cl.⁷ .............................................. G06K 19/06
(52) U.S. Cl. ....................................... 235/492; 235/380
(58) Field of Search ................................ 235/380, 492; 710/64, 2

(56) References Cited

U.S. PATENT DOCUMENTS 6,089,459 A  *  7/2000  Eisele et al. ................. 235/492
6,125,405 A  *  9/2000  Farges ............................. 710/2
6,175,517 B1 *  1/2001  Jigour et al. ................... 365/63

OTHER PUBLICATIONS

Zoreda and Oton Smart Cards, Artec Hous publishers, pp. 100–109 (1994).*

* cited by examiner

Primary Examiner—Mark Tremblay
(74) Attorney, Agent, or Firm—Foley & Lardner

(57) ABSTRACT

An interface module for the operation of a chip card for data exchange between the chip card and a microprocessor system. The interface module includes circuits for communicating with the microprocessor system, communicating with the chip card in accordance with data and control instructions received from the microprocessor system, generating and/or controlling the chip card supply voltage, and for generating a clock signal which modified with respect to a clock frequency for the chip card from the clock pulse of a piezoelectric crystal oscillator. The interface module enable the microprocessor system to immediately control the chip card without the interconnection of another microprocessor.

29 Claims, 5 Drawing Sheets

μP-Bus-Operating Mode

ECP-Bus-Operating Mode

Switch-On Sequence

Switch-Off Sequence

INTERFACE MODULE FOR OPERATION BETWEEN A CHIP CARD AND A MICROPROCESSOR-BASED SYSTEM

FIELD OF INVENTION

The invention relates to a means for the operation of a chip card and the data exchange between a chip card and a microprocessor-based system, e.g. a personal computer. The term microprocessor-based covers any system which includes a microprocessor, for example, a system with a microcontroller or a personal computer.

BACKGROUND OF THE INVENTION

Over the previous years, chip cards have already been employed on a large scale as bank and credit cards, identification and access authorisation cards in the mobile radio area (GMS cards: global system of mobile communication), health insurance cards, telephone cards, as well as cards for many other applications.

For communication with so-called card writing/reading devices, chip cards are provided with metallic contact surfaces on the card body, which are connected with the chip (microprocessor chip or memory chip with logic unit) in the card. The card writing/reading device itself comprises a contact-making unit with contacts which correspond to the contact surfaces of the chip card, where the contacts and the contact surfaces are brought into an electrically conductive connection after the insertion of the card into the card writing/reading device. One contact surface is intended for the supply voltage (VCC), one for the reference voltage/ground (GND), one for the clock frequency (CLK), one for the serial data exchange (I/O), and one for the reset line (RST).

For standardisation reasons the chip dimensions, the position of the contact surfaces as well as the electrical signals from and to the chip card, including the data transmission, are standardized (ISO 7810, 7816-2, 7816-3).

In addition to the above mentioned five contact surfaces, the standards also provide for a contact surface for the supply of a programming voltage which, however, is no longer required for the majority of chip cards because these generate the programming voltage themselves internally in the chip from the supply voltage. In addition, two contact surfaces are provided by the standards for future applications.

The data exchange between chip card and card writing/reading device is effected in a synchronous manner in the case of memory cards, while it is effected in an asynchronous manner in the case of microprocessor cards. Two protocols (T=0 and T=1) are standardized for the asynchronous data transmission, with one (T=0) being byte-oriented and the other (T=1) being block-oriented.

From U.S. Pat. No. 4,767,920 a card writing/reading device for chip cards is known via which the communication between a computer or, in general, between a microprocessor-based system and a chip card is made possible. In addition to the contact-making unit for the control and supply of the chip card and for the data exchange with the chip card, the card writing/reading device comprises several discrete components. These are, among others:

a microprocessor for receiving and forwarding the serially sent data from the chip card to a microprocessor-based system or for receiving and forwarding the data sent by the microprocessor-based system to the chip card, respectively, with the communication protocol to be used in each case being stored as a control program in the microprocessor of the card writing/reading unit;

a circuit for the generation of the supply voltage (VCC) for the chip card;

a circuit for the generation of the clock signal for the chip card from the clock pulse of a piezoelectric crystal oscillator.

It is disadvantageous here that the speed of the communication is relatively slow between the microprocessor-based system and the chip card with a card writing/reading device, including a microprocessor, connected between the microprocessor system and the chip card because a program which is stored in the microprocessor of the card writing/reading device must be executed under serial execution of the individual command steps for the data transfer from and to the chip card for the conversion of the corresponding communication protocol (e.g. T=0). In addition, the integration of such a card writing/reading device which includes a microprocessor into a microprocessor-based system is very time consuming and costly because it is mandatory that the persons who have to carry out the integration have a precise knowledge of the type of microprocessor in the card writing/reading device and the way of control and communication with this type of microprocessor. This is further complicated in particular by the fact that the manufacturers and providers of microprocessor-based systems and the manufacturers and providers of card writing/reading devices are not identical. Furthermore, the types of microprocessors employed in the microprocessor-based system and in the card writing/reading device are generally not identical. An example for this would be a company which offers an attendance recording system on a personal computer and plans to include employee identification cards in the form of chip cards for attendance recording and, for this reason, has to integrate a corresponding card writing/reading device (interface) into its system which is not to be developed by said company.

BRIEF SUMMARY OF THE INVENTION

According to an embodiment of the invention, an interface module is provided for the operation of a chip card and data exchange between a microprocessor-based system, where the chip card includes electrical contact surfaces for a supply voltage, a clock signal, a reference voltage/ground, a serial data input/output, and a reset connection. The contact surfaces correspond to contacts of a contact-making unit, and the contacts are connected with the interface module. Advantageously, the chip card may be driven by the microprocessor-based system immediately via the interface unit without the interconnection of another microprocessor.

The interface module according to this embodiment includes a first circuit for communicating with the microprocessor-based system, a second circuit for communicating with the chip card in accordance with data and control instructions received from the microprocessor-based system, a third circuit for generating and/or controlling the supply voltage for the chip card, and a fourth circuit for generating a clock signal which is modified with respect to a clock frequency for the chip card from the clock pulse of an external clock.

The interface module may be formed as a monolithic semiconductor module. The first circuit may comprise a parallel interface for communicating with the microprocessor-based system. The parallel interface may comprise a buffer memory area using the first-in/first-out (FIFO) principle, for the temporary storage of data and control instructions. The parallel interface may support at least parallel interface modes ECP bus and μP bus, where the microprocessor-based system indicates the desired mode of the interface module via a selection signal, and where the interface module is automatically configured for supporting the selected mode upon the microprocessor-based system indicating the selected mode.

The interface module may alternatively comprise a serial interface for communicating with the microprocessor-based system. The interface module may include a fifth circuit for evaluating a Card In signal which indicates whether a chip card is properly positioned in the contact-making unit, and where predetermined switching sequences are executed automatically in the interface module dependent on the Card In signal, and where the switching sequences define further communication with the chip card and the switching condition of the respective contacts of the contact-making unit. The switching sequence may be initiated in the interface module via a corresponding control instruction of the microprocessor-based system which defines which supply voltage is generated for the chip card.

The third circuit of the interface module may be adapted for generating at least two different high supply voltages. The interface module may comprise a UART module for the parallel/serial conversion of data exchanged between the microprocessor-based system and the chip card, including a circuit for fault detection under the utilisation of a parity bit. The interface module may comprise a signal register which actively controls serial data input/output, reset connection, and clock chip contacts in the case of operation/data exchange of synchronous cards.

The interface module may comprise a power check and switch-off unit which monitors the supply current to the chip card and which automatically places supply voltage, serial data input/output, clock, and reset connection signals in an established sequence on defined levels when the supply current exceeds a predetermined value.

The fourth circuit of the interface module may be adapted for the generation of at least two different high clock frequencies for the chip card. The microprocessor-based system may define via a corresponding control instruction which of the at least two different high clock frequencies is generated for the chip card.

The interface module may be adapted to support chip cards in which at least two different division factors for deriving a data transmission rate are stored. The external clock may be a piezoelectric crystal oscillator.

According to another embodiment of the invention, a method of exchanging data between a chip card and a microprocessor-based system through an interface module is provided. The method includes enabling communication with the microprocessor-based system, enabling communication with the chip card in accordance with data and control instructions received from the microprocessor-based system, generating and/or controlling a supply voltage for the chip card, generating a clock signal which is modified with respect to a clock frequency for the chip card from a clock pulse of an external clock, and driving the chip card with the microprocessor-based system directly without the interconnection of another microprocessor.

The enabling communication with the microprocessor-based system step may comprise the step of receiving information signals in parallel from the microprocessor-based system, and temporarily storing received data and control instructions using a first-in/first-out principle. The receiving step may comprise indicating a desired mode of the interface module via a selection signal of the microprocessor-based system, and automatically configuring the interface module for supporting the selected mode upon the indication of the desired mode.

The enabling communication with the microprocessor-based system may comprise communicating with the microprocessor-based system via a serial interface.

The method may comprise evaluating a Card In signal which indicates whether a chip card is properly positioned in a contact-making unit, automatically executing predetermined switching sequences in the interface module dependent on said Card In signal, and defining, via the predetermined switching sequences, further communication with the chip card and the switching condition of respective contacts of the contact-making unit.

The method may comprise generating at least two different high supply voltages. The method may comprise initiating a predetermined switching sequence in the interface module via a corresponding control instruction of the microprocessor-based system, and thereby defining which supply voltage is generated on the chip card.

The method may comprise converting parallel/serial data exchanged between the microprocessor-based system and the chip card while detecting faults using a parity bit. The method may comprise actively controlling serial data input/output, reset connection, and clock card contacts in the case of operation/data exchange of synchronous cards.

The method may comprise monitoring the supply current to the chip card, and automatically placing supply voltage, serial input/output, clock, and reset connection signals in an established sequence on defined levels when the supply current exceeds a predetermined value.

The method may comprise generating at least two different high clock frequencies for the chip card. The method may comprise defining, via a corresponding control instruction, which of the at least two different high clock frequencies is generated for the chip card. Where the interface module is adapted to support chip cards in which at least two different division factors are stored, the method may further comprise deriving a data transmission rate using one of the at least two different division factors.

It is the object of the invention to provide a means for the operation of a chip card and the data communication between a chip card and a microprocessor-based system, which enables a rapid communication between the microprocessor-based system and the chip card, which can easily be integrated in the microprocessor-based system, and which, in addition, can be manufactured economically.

According to the invention this object is solved in that the means is adapted as a peripheral interface unit with reference to the microprocessor-based system, which comprises the following components:

a circuit for the communication with the microprocessor-based system;

a circuit for the communication with the chip card in accordance with the data and control instructions which are received from the microprocessor-based system;

a circuit for the generation of the supply voltage (VCC) for the chip card;

a circuit for the generation of a signal (CLK) which is modified with respect to the clock frequency for the chip card from the clock pulse of an external piezoelectric crystal.

The chip card is driven by the microprocessor-based system immediately via this peripheral interface unit without the interconnection of another microprocessor. The means according to the invention thus represents a hardware support (hardware protocol converter) of the microprocessor-based system, with certain time-critical sequences (bottom layers of the used communication protocol) in the communication with the chip card no longer being realized by software but by an invariably defined circuit ("hardwired") which as a function of certain input signals performs only predetermined switching sequences. Only those sequences (upper layer of the communication protocol) which are not as time critical are software-implemented in the microprocessor-based system. This results in a considerable acceleration of the communication between the chip card and the microprocessor-based system.

The means according to the invention can be integrated into a microprocessor-based system much more easily than a card writing/reading device with its own microprocessor because it is no longer necessary that those who have to carry out the integration and who, though they are familiar with their own microprocessor-based system, must also get to know a type of microprocessor which is substantially unknown to them. Instead a software library to be installed in the microprocessor-based system for driving the means is provided for the means according to the invention for various microprocessor-based systems. This software library preferably comprises various communication protocols. This renders the means according to the invention suitable for an application in various microprocessor-based systems.

The means according to the invention is implemented in a particularly advantageous manner as a monolithic interface semiconductor module in the form of an application-specific integrated circuit, a so-called ASIC (acronym of the term Application Specific Integrated Circuit). The interface semiconductor module is preferably realized in CMOS technology in order to ensure a low power consumption.

The omission of the microprocessor in particular and the integration of the various components on a monolithic semiconductor module contribute to the fact that the means according to the invention represents an economic solution, especially in the case of great quantities. The omission of the microprocessor also reduces the chip surface for the monolithic semiconductor module, which again reduces the costs.

Moreover, the integration of various components on a monolithic semiconductor module results in considerable space savings compared to discretely arranged circuits on a board, which opens new possibilities for the design of terminal units.

It must be emphasized in particular that both digital and analog circuits/functions can be realized on the monolithic interface module. Thus, an analog circuit for generating and monitoring the supply voltage of the chip card is provided on the monolithic semiconductor module. There is, however, also a purely digital circuit provided which controls the supply voltage which is externally realized by an analog circuit.

The means according to the invention is intended, for example, for the installation in card writing/reading devices which are connected with a microprocessor-based system, or for the installation in portable microprocessor-based terminal units which comprise a card insertion slot and a contact-making unit, e.g. mobile card readers for health insurance cards. The microprocessor/controller contained therin may communicate with the chip card via the means according to the invention, and, on the other hand, may be capable of performing other functions: storage and processing of card data, driving the keyboard and display, etc. In addition, the means according to the invention can also be employed in stationary microprocessor-based systems (e.g. automatic teller machines) in which a card writing/reading device is integrated.

The means according to the invention will be explained in more detail in the following with reference to the accompanying drawings, and further advantages will become apparent.

DETAILED DESCRIPTION OF THE INVENTION

Figure 1:
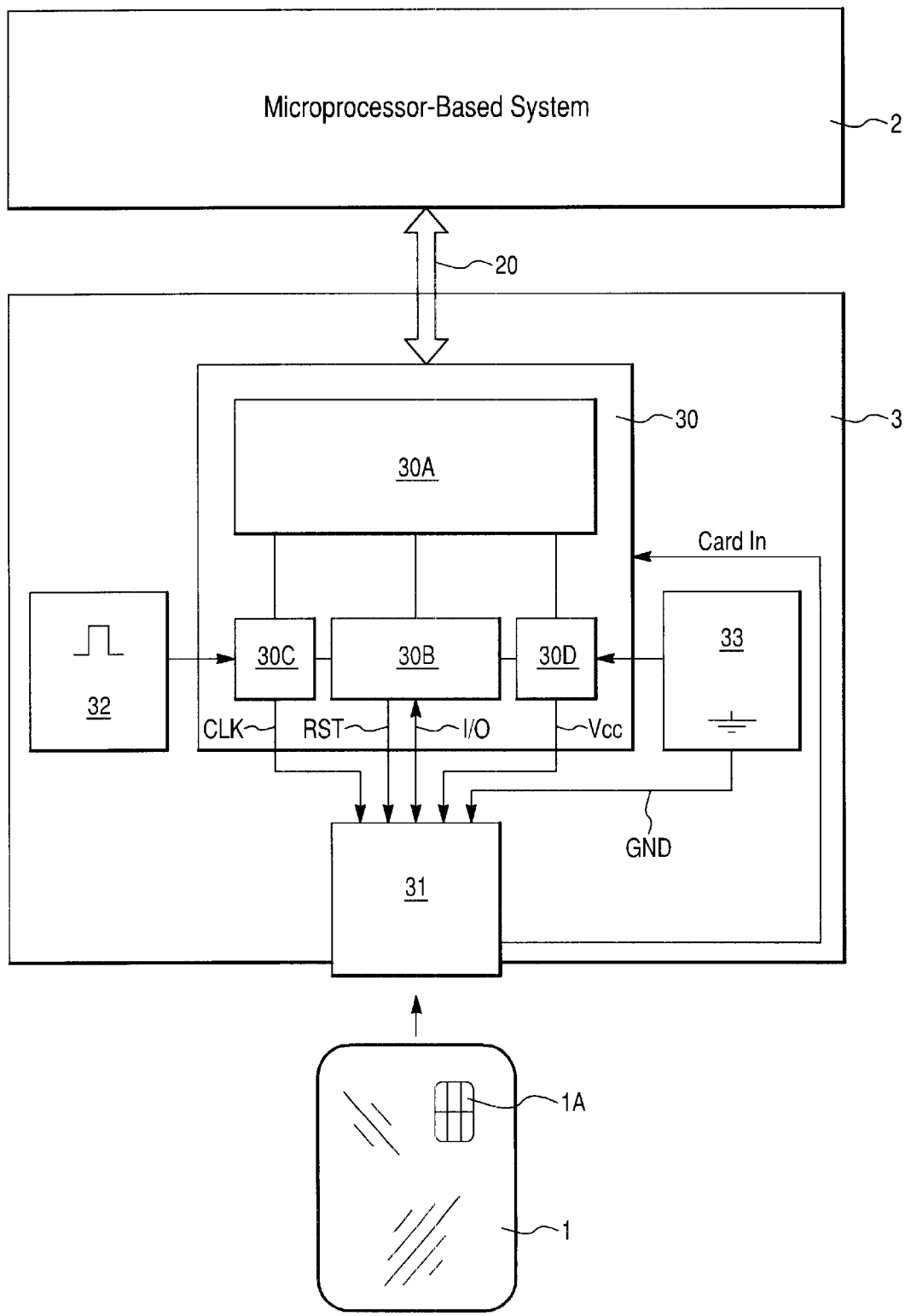
FIG. 1 is a schematic illustration of an embodiment of the interface module according to the present invention interfaced with a microprocessor based system and a chip card.

FIG. 1 is a schematic illustration of a microprocessor-based system (2), a card writing/reading device (3) with a contact-making unit (31) and a chip card (1) with its contact surfaces (1A) to be inserted into the contact-making unit (31). The microprocessor-based system (2) is preferably connected with the means (30) according to the invention via a parallel, bidirectional interface, perferably in the form of a monolithic interface semiconductor module which is arranged in the card writing/reading device (3). For this purpose, a multi-strand interface cable (20) is arranged between the microprocessor-based system (2) and the card writing/reading device (3). In addition to the means (30) according to the invention the card writing/reading device (3) accommodates a piezoelectric crystal oscillator (32) and power supply unit (33), which may be a power pack, battery, or rechargeable accumulator.

A circuit (30A) for the communication with the microprocessor-based system (2) and a circuit (30B) for the communication with the chip card (1) are integrated in the monolithic interface semiconductor module (30), the latter of which enables the communication in accordance with the data and control instructions received from the microprocessor-based system (2). In additon, a circuit (30D) for generating the supply voltage (VCC) for the chip card (1) and a circuit (30C) for generating the clock signal (CLK) for the chip card (1) are integrated in the monolithic interface semiconductor module (30).

One embodiment of the circuit (30A) comprises a parallel, bidirectional interface. The circuit (30A) comprises in a particularly advantageous manner a buffer memory area, in particular one to the first-in/first-out (FIFO) principle, for the temporary storage of data and control instructions. This prevents data losses and thus ensures a reliable operation, even then when the microprocessor-based system is involved in other matters. An interface of this type is known to those with skill in the art under the abbreviation ECP (Extended Capability Port to Standard IEEE1248) and, in the meantime, has become a standard.

In a second embodiment the circuit (30A) comprises a so-called $\mu P$ bus interface.

In a preferred embodiment both the above mentioned ECP interface as well as the $\mu P$ bus interface are integrated in the means (30) according to the invention. The selection of a chosen interface mode is then made via the control line $S_0$ (see FIG. 2 and FIG. 3). Depending on which operating mode has been selected, the interface module (30) will be correspondingly reconfigured to support the selected mode, whereupon the functionality of the control line (S, S*) changes. FIGS. 3A and 3B each illustrate the function state diagram versus time for the control/signal lines (S, S*) in the case of the write access of the microprocessor-based system (2) to the interface module (30). These diagrams and the terminology of the signal lines are known to those with skill in the art.

In addition, provisions are made for several of the interface units (30) according to the invention to be connected to a parallel interface of the microprocessor-based system (2). The selection of a certain interface unit (30) is then made via an identification number (so-called device ID).

In an alternative embodiment the circuit (30A) comprises a serial interface.

Figure 2:
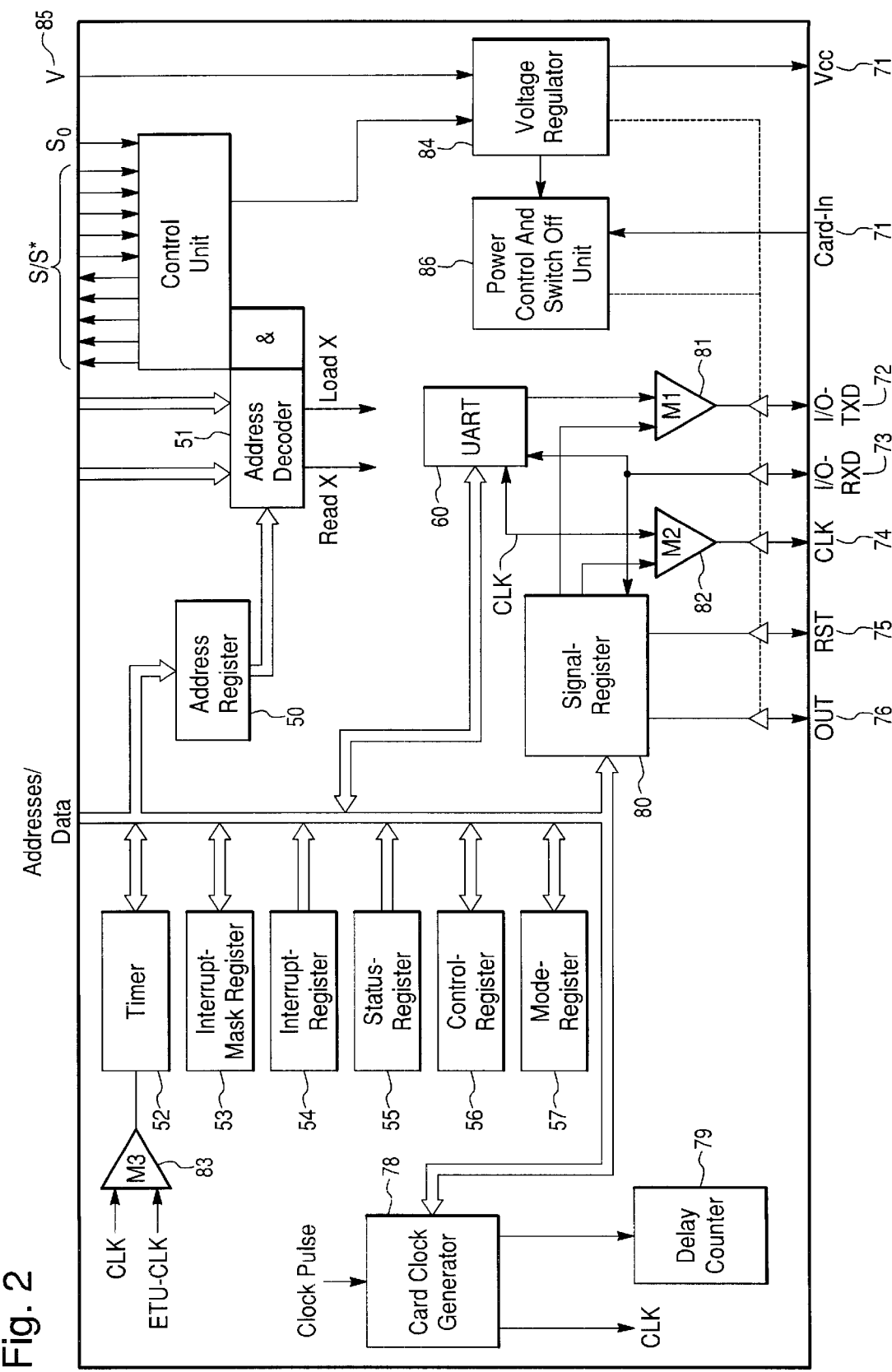
FIG. 2 is a detailed illustration of an embodiment of the interface module according to the invention.
Figure 3:
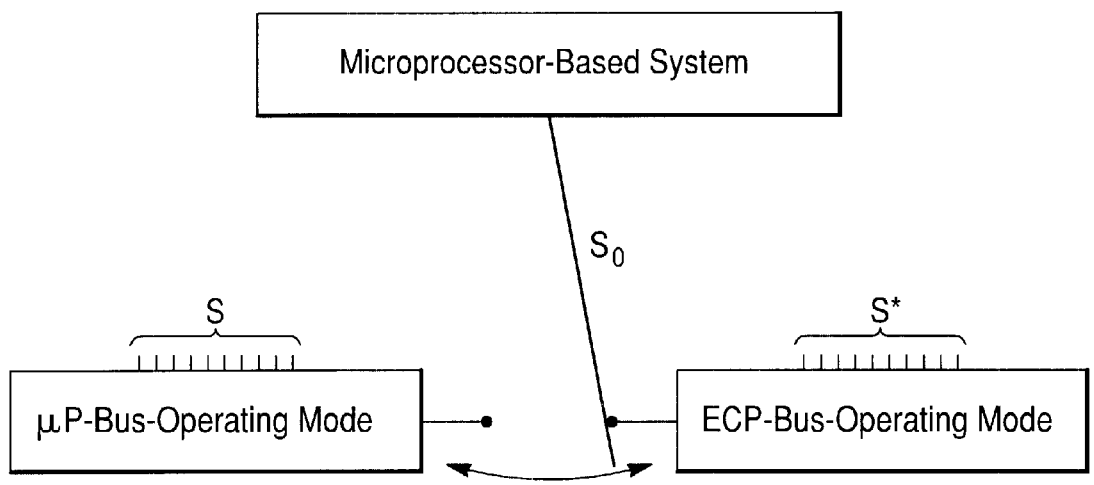
FIG. 3 is an illustration of the selection of an interface mode via control lines according to an embodiment of the invention.
Figure 3A:
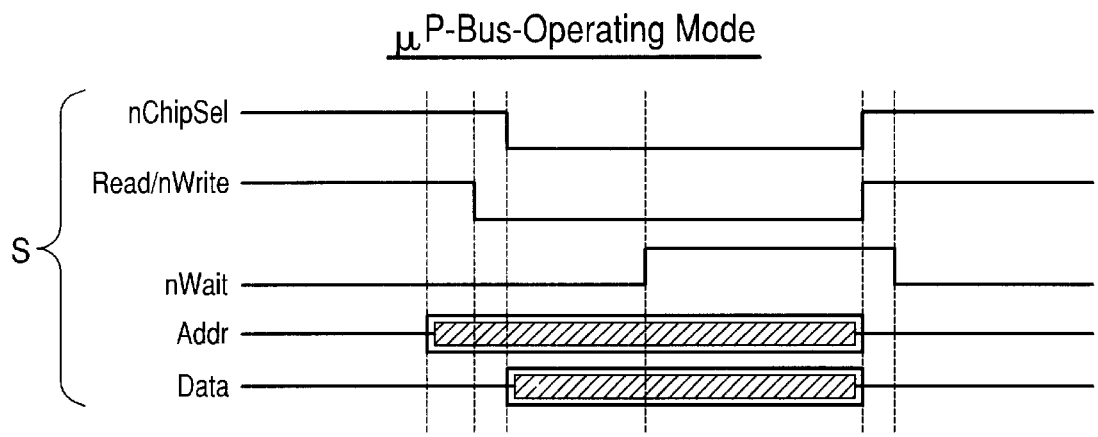
FIGS. 3A and 3B are illustrations of a function state diagram versus time for a $\mu P$ bus interface and ECP bus interface, respectively, for control/signal lines in the case of write access of a microprocessor-based system according to an embodiment of the interface module of the invention.
Figure 3B:
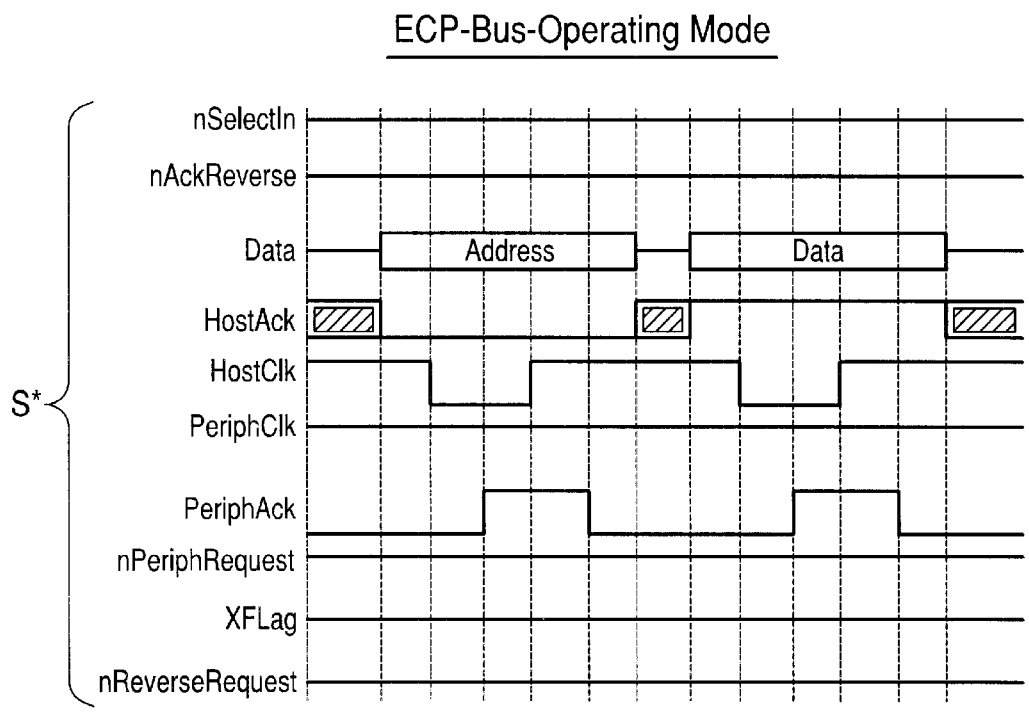

FIG. 2 is a detailed illustration of the interface unit (30) according to the invention. This comprises a control unit which can be reconfigured depending on the interface mode and which controls the communication with the microprocessor-based system (2). A timer (52) or a register (interrupt mask register (53), interrupt register (54), status register (55), control register (56), or mode register (57)) may be selected via an address register (50) in combination with an address decoder (51). Thus, the timer or register may be read from or written to by the microprocessor-based system. These registers are connected via an internal bus system with a UART (60) (Universal Asynchronous Receiver/Timer) which performs the parallel/serial conversion of the data from and to the chip card. Preferably, this UART comprises a circuit for fault detection with respect to the data bits to be replaced under the utilisation of a parity bit.

Interrupt events, which must be able to initiate an interrupt, are stored in the interrupt register (54). For example, interrupt events include a current increase on the supply (70) (Vcc) line to the chip card, and a chip card being inserted or pulled out. A masking in the interrupt mask register (53) can determine which of the interrupt registers are actually utilized for interrupts.

The condition of the supply line (70) (Vcc) to the chip card (1) or the occurrence of a parity fault during data transmission is stored in the status register (55).

The convention of the data transmission with respect to the allocation of the logic states (1, 0) to the voltage levels (high, low) is defined in the control register (56).

The card clock generator (78) generates the clock signal (CLK) for the chip card from the externally applied clock pulse of a piezoelectric crystal oscillator (32). For this purpose the frequency of the clock pulse supplied by the piezoelectric crystal oscillator (32) is divided. As division factors, the means (30) according to the invention provides the numbers 2to 31. The permissible range for the externally supplied clock pulse of the piezoelectric crystal oscillator (32) is from 1 MHz to 32 MHz; a typical value is 29.4 MHz. The means (30) according to the invention is therefore very versatile with respect to the frequency variation of the clock signal (CLK) for the chip card (1). With a piezoelectric crystal oscillator (32) of 29.4 MHz and a division factor of 8, for example, a frequency of 3.675 MHz is obtained.

The data transmission rate for the data transfer from and to the chip card (1) is then derived from the chip card clock signal (CLK) and the associated frequency which is also programmable with the means (30) according to the invention as explained above. In this context, one has to know that another division factor is included in a microprocessor chip card, which indicates the number of clock pulses (CLK) per bit from which the time duration for one bit (elementary time unit, ETU) results. The means (30) according to the invention is even capable of supporting chip cards (1) which include more than one division factor for the generation of different transmission rates (corresponding to different ETU's). The chip card (1) informs the interface module (30) after a reset by means of a so-called ATR (Answer To Reset, see the above mentioned standards) which division factors are possible. In a downstream protocol selection process (PTS, Protocol Type Selection) the chip card (1) and the interface module (30) agree on a common division factor, preferably the lowest possible, which accordingly yields the highest transmission rate. The interface module (30) supports the division factors from 1 to 2047. Initially, the division factor 372 is activated because the ATR from the chip card (1) is also sent with the ATR, by means of which further possible division factors are indicated. The means (30) according to the invention is thus also very versatile with respect to the possible transmission rates.

In the case of synchronous cards the chip card clock pulse (CLK) and the data transmission on the I/O line (setting of the corresponding levels) are effected immediately via the signal register (80), for which purpose the multiplexers M1 (81) and M2 (82) are connected accordingly. In the case of asynchronous cards (chip card protocols T=0 and T=1) the data transmission on the I/O line is effected via the UART (60).

The means (30) according to the invention comprises one I/O line for sending I/O-TXD (72) (Transmit Data) and another one for receiving I/O-RXD (73) (Receive Data). A driver is provided for each direction so that data transmission via greater distances is also possible. These lines are then combined again in the contact-making unit (31) as an I/O contact for the chip card (1).

The signal register also generates the reset signal (75) (RST) for the chip card (1) and an OUT signal (76) which is still free for use. For example, an LED could be driven via the OUT signal (76), the LED indicating whether a card is inserted.

The timer (52), which is optionally adjustable via the multiplexer M3 (83), counts either the card clock pulses (CLK) or the ETU clock pulses, and generates a timeout signal for a waiting period to be maintained between data strings.

The voltage regulator (84) generates the supply voltage (70) (Vcc) for the chip card (1) from an external supply voltage (85) (V). It is designed in such a manner that it can generate at least two optional, different supply voltages (VCC) for the support of different cards (3 V cards, 5 V cards). Upon switching from one supply voltage to another, the levels for the I/O line are automatically adjusted.

Figure 4A:
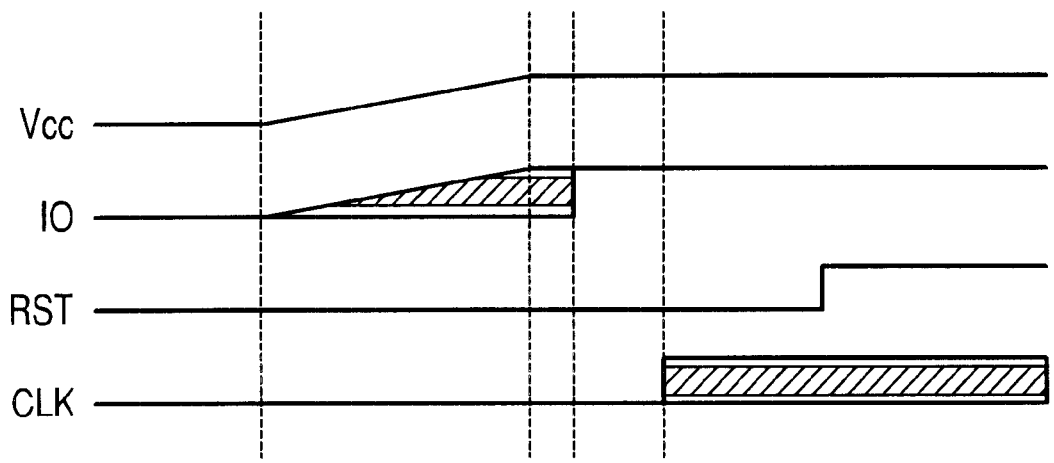
FIGS. 4A and 4B are illustrations of a switch-on sequence and switch-off sequence, respectively, for signal lines according to an embodiment of the invention.
Figure 4B:
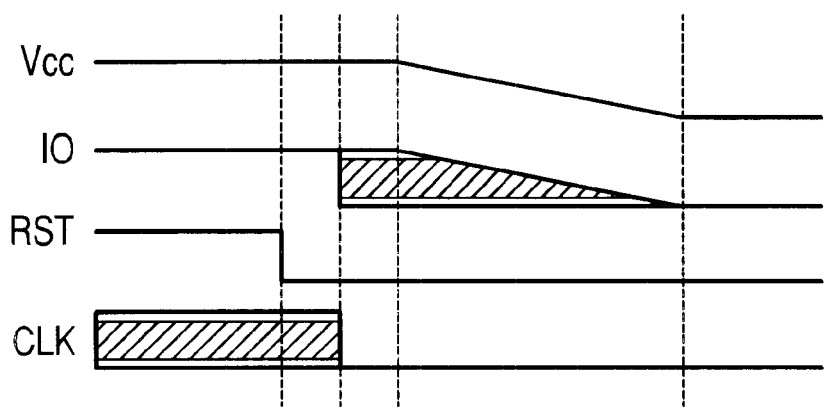

In addition to the voltage regulator (84), a power check and switch-off unit (86) is provided which monitors the supply current to the chip card (on the VCC line). If the monitored supply current exceeds a predetermined value, the power check and switch-off unit (86) places the signals, Vcc (70), I/O (72, 73), CLK (74), and RST (75), in an established sequence on defined levels, such as the switch-off sequence shown in FIG. 4B. The limit is approximately 15 mA. For higher currents the means (30) according to the invention, should be provided with an external transistor circuit.

The switch-off sequence is also initiated when the chip card (1) is pulled out which is determined by means of a card-in contact in the contact-making unit (31). The switch-off sequence is also initiated upon each reset of the means (30) according to the invention.

The switch-off sequence is started after a reaction time of typically 100 μs following the initiating event. A delay counter is provided for establishing the reaction time. The reaction time of 100 μs allows the card to be brought into a defined condition if, for example, it is erroneously pulled out during the communication.

The switch-on sequence (see FIG. 4A) is effected software-controlled by the microprocessor-based system.

The means (30) according to the invention is capable of generating signals on the lines I/O (72, 73), RST (75), and CLK (74), with a very small, defined maximum edge envelope: 100 ns for RST and I/O, and 10 ns for CLK. The connections (I/O, VCC, RST, CLK) are designed in a high voltage protected manner by means of internal circuitry so that static charges of an inserted chip card (1) do not harm the means according to the invention.

What is claimed is:

1. An interface module for the operation of a chip card and data exchange between the chip card and a microprocessor-based system, wherein the chip card includes electrical contact surfaces for a supply voltage, a clock signal, a reference voltage/ground, a serial data input/output and a reset connection, wherein said contact surfaces correspond to contacts of a contact-making unit, wherein the contacts are connected with the interface module, and wherein the chip card may be driven by the microprocessor-based system immediately via the interface module without the interconnection of another microprocessor, comprising:

a first circuit for communicating with the microprocessor-based system;

a second circuit for communicating with the chip card in accordance with data and control instructions received from the microprocessor-based system;

a third circuit for generating and/or controlling the supply voltage for the chip card;

a fourth circuit for generating a clock signal for the chip card, where the frequency of the clock signal is modified with respect to a clock frequency for the chip card from a clock pulse of an external clock;

and a plurality of registers, the first and second circuits connected to the plurality of registers to implement a protocol conversion on the interface module.

2. The interface module according to claim 1, wherein the interface module is formed as a monolithic semiconductor module.

3. The interface module according to claim 1 wherein the first circuit comprises a parallel interface for communicating with the microprocessor-based system.

4. The interface module according to claim 3, wherein the parallel interface for communicating with the microprocessor-based system comprises a buffer memory area using the first-in/first-out principle, for the temporary storage of data and control instructions.

5. The interface module according to claim 3, wherein the parallel interface supports at least a parallel interface mode ECP bus and an μP bus, wherein the microprocessor-based system indicates the desired mode of the interface module via a selection signal, and wherein the interface module is automatically configured for supporting the selected mode upon the microprocessor-based system indicating the selected mode.

6. The interface module according to claim 1, wherein the first circuit comprises a serial interface for communicating with the microprocessor-based system.

7. The interface module according to claim 1, further comprising:

a fifth circuit for evaluating a Card In signal which indicates whether a chip card is properly positioned in the contact-making unit, and wherein predetermined switching sequences are executed automatically in the interface module dependent on said Card In signal, and wherein the predetermined switching sequences define further communication with the chip card and the switching condition of the respective contacts of the contact-making unit.

8. The interface module according to claim 1, wherein the third circuit is adapted for for generating at least two different high supply voltages.

9. The interface module according to claim 7, wherein a predetermined switching sequence is initiated in the interface module via a corresponding control instruction of the microprocessor-based system which defines which supply voltage is generated for the chip card.

10. The interface module according to claim 1, further comprising:

a UART module for the parallel/serial conversion of data exchanged between the microprocessor-based system and the chip card, including a circuit for fault detection under the utilisation of a parity bit.

11. The interface module according to claim 1, further comprising a signal register which actively controls serial data input/output, reset connection, and clock card contacts in the case of operation/data exchange of synchronous cards.

12. The interface module according to claim 1, further comprising a power check and switch-off unit which monitors the supply current to the chip card and which automatically places supply voltage, serial data input/output, clock, and reset connection signals in an established sequence on defined levels when the supply current exceeds a predetermined value.

13. The interface module according to claim 1, wherein the fourth circuit is adapted for the generation of at least two different high clock frequencies for the chip card.

14. The interface module according to claim 13, wherein the microprocessor-based system defines via a corresponding control instruction which of the at least two different high clock frequencies is generated for the chip card.

15. The interface module according to claim 1, wherein the interface module is adapted to support chip cards in which at least two different division factors for deriving a data transmission rate are stored.

16. The interface module of claim 1, wherein the external clock is a piezoelectric crystal oscillator.

17. A method of exchanging data between a chip card and a microprocessor-based system through an interface module, comprising:

enabling communication with the microprocessor-based system;

enabling communication with the chip card in accordance with data and control instructions received from the microprocessor-based system;

generating and/or controlling a supply voltage for the chip card;

generating a clock signal for the chip card, where the frequency of the clock signal is modified with respect to a clock frequency for the chip card from a clock pulse of an external clock;

implementing a protocol conversion on the interface module; and driving the chip card with the microprocessor-based system directly without the interconnection of another microprocessor.

18. The method of claim 17, wherein the enabling communication with the microprocessor-based system step comprises the step of receiving information signals in parallel from the microprocessor-based system; and temporarily storing received data and control instructions using a first-in/first-out principle.

19. The method of claim 18, wherein the receiving step comprises:

indicating a desired mode of the interface module via a selection signal of the microprocessor-based system; and automatically configuring the interface module for supporting the selected mode upon the indication of the desired mode.

20. The method of claim 17, wherein the enabling communication with the microprocessor-based system comprises communicating with the microprocessor-based system via a serial interface.

21. The method of claim 17, further comprising:

evaluating a Card In signal which indicates whether a chip card is properly positioned in a contact-making unit;

automatically executing predetermined switching sequences in the interface module dependent on said Card In signal; and defining, via the predetermined switching sequences, further communication with the chip card and the switching condition of respective contacts of the contact-making unit.

22. The method of claim 17, further comprising:

generating at least two different high supply voltages.

23. The method of claim 21, further comprising:

initiating a predetermined switching sequence in the interface module via a corresponding control instruction of the microprocessor-based system, and thereby defining which supply voltage is generated on the chip card.

24. The method of claim 17, further comprising:

converting parallel/serial data exchanged between the microprocessor-based system and the chip card while detecting faults using a parity bit.

25. The method of claim 17, further comprising:

actively controlling serial data input/output, reset connection, and clock card contacts in the case of operation/data exchange of synchronous cards.

26. The method of claim 17, further comprising:

monitoring the supply current to the chip card; and automatically placing supply voltage, serial input/output, clock, and reset connection signals in an established sequence on defined levels when the supply current exceeds a predetermined value.

27. The method of claim 17, further comprising;

generating at least two different high clock frequencies for the chip card.

28. The method of claim 27, further comprising:

defining, via a corresponding control instruction, which of the at least two different high clock frequencies is generated for the chip card.

29. The method of claim 17, wherein the interface module is adapted to support chip cards in which at least two different division factors are stored, further comprising:

deriving a data transmission rate using one of the at least two different division factors.

\* \* \* \* \*